(12) United States Patent
Zegman

(10) Patent No.: US 11,550,934 B2
(45) Date of Patent: Jan. 10, 2023

(54) SYSTEMS AND METHODS FOR THE EFFICIENT DETECTION OF IMPROPERLY REDACTED ELECTRONIC DOCUMENTS

(71) Applicant: CHECK POINT SOFTWARE TECHNOLOGIES LTD., Tel Aviv (IL)

(72) Inventor: Tamir Zegman, Tel Aviv (IL)

(73) Assignee: CHECK POINT SOFTWARE TECHNOLOGIES, LTD., Tel Aviv (IL)

(*) Notice: Subject to any disclaimer, the term of this patent is extended or adjusted under 35 U.S.C. 154(b) by 203 days.

(21) Appl. No.: 17/202,471

(22) Filed: Mar. 16, 2021

(65) Prior Publication Data

US 2022/0300621 A1   Sep. 22, 2022

(51) Int. Cl.
| | | |
|---|---|---|
| G06F 21/60 | (2013.01) | |
| G06F 40/117 | (2020.01) | |
| G06T 7/194 | (2017.01) | |
| G06T 7/149 | (2017.01) | |
| G06V 30/412 | (2022.01) | |
| G06V 30/414 | (2022.01) | |

(52) U.S. Cl.
CPC .......... G06F 21/602 (2013.01); G06F 40/117 (2020.01); G06T 7/149 (2017.01); G06T 7/194 (2017.01); G06V 30/412 (2022.01); G06V 30/414 (2022.01)

(58) Field of Classification Search
CPC .......... G06F 21/10; G06F 21/62; G06F 15/16; G06F 3/14; G06F 21/602; G06F 40/117; G06T 5/00; G06T 7/149; G06T 7/194; G06V 30/412; G06V 30/414
See application file for complete search history.

(56) References Cited

U.S. PATENT DOCUMENTS

| | | | | |
|---|---|---|---|---|
| 6,115,497 A | * | 9/2000 | Vaezi | G06V 10/273 |
| | | | | 382/168 |
| 9,805,010 B2 | * | 10/2017 | Pittenger | G06F 40/197 |
| 2009/0016615 A1 | * | 1/2009 | Hull | G06V 30/414 |
| | | | | 382/217 |
| 2016/0063322 A1 | * | 3/2016 | Déjean | G06V 30/412 |
| | | | | 382/176 |
| 2017/0124347 A1 | * | 5/2017 | Kamata | G06F 16/93 |
| 2018/0205833 A1 | * | 7/2018 | Fujiki | G06V 30/15 |
| 2020/0042837 A1 | * | 2/2020 | Skinner | G06V 10/764 |
| 2020/0097713 A1 | * | 3/2020 | Cramer | G06V 30/414 |

OTHER PUBLICATIONS

IP.com Altering Scanned Documents for Redaction, Masking and other Edit Operations—2014 (Year: 2014).*
The Rules of Redaction Identify, Protect, Review (and Repeat)—2009 (Year: 2009).*

* cited by examiner

Primary Examiner — Nizar N Sivji

(57) ABSTRACT

A method is provided for identifying improperly redacted information in documents. The documents are analyzed to detect redacted areas and text elements and to identify an intersection between a redacted area and a text element. When an area of the intersection is greater than an intersection threshold, the document is identified as containing improperly redacted information.

20 Claims, 3 Drawing Sheets

SYSTEMS AND METHODS FOR THE EFFICIENT DETECTION OF IMPROPERLY REDACTED ELECTRONIC DOCUMENTS

TECHNICAL FIELD

The present disclosure relates generally to electronic documents and more particularly to redacting text from electronic documents.

BACKGROUND

The use of electronic documents by companies and individuals is ubiquitous. In many cases electronic documents contain confidential information such as personal health records, personally identifiable information (PII), trade secrets, sales and marketing plans, product plans, notes related to patentable inventions, customer and supplier information, financial data, legal information, state secrets, etc. The disclosure of such confidential information could be harmful to any individual or organization that the information relates to.

Redaction is the process of sanitizing a document to make confidential information unreadable, unintelligible, or to remove all traces of confidential information from the document. Redaction is often performed before a document containing confidential information is made available to a larger audience. For example, a party to a legal case might file with the court a confidential document under seal. Such a document would only be made available to specific parties such as the court or other parties of the case. The party filing the document would, in many cases, be required to also file a redacted version of the document that is made available to the general public. Another example is when a US government agency responds to a freedom of information act request by releasing to the public documents that were previously undisclosed. In many cases these documents are first redacted before being published.

SUMMARY

Many different formats are used to represent electronic documents including Portable Document Format (PDF), DOCX, XLSX, PPTX, EPUB, ODX, Rich Text Format (RTF), etc. Numerous applications exist for editing and viewing such documents including Acrobat Reader, Microsoft Word, Microsoft Excel, Microsoft PowerPoint, etc. Many such formats can support presenting text along with graphical images. Images and text can be combined in various ways including side by side as well as one over the other with full or partial overlap between the two.

A common technique for redacting a document is to place an image on top of the text to be redacted so that the image conceals the text. Often, the image laid over the text has a shape of a rectilinear polygon. Further, in many cases, the concealing image is monochrome (e.g., solid black). Also, sometimes the concealing image is highlighted using a different color border (e.g. yellow or red).

Redacting text in this way is likely to obscure the text from the untrained eye, but the obscured text is often still present in the document and can be extracted using various techniques including: using standard applications for viewing the document, by selecting the redacted area and copying and pasting the text from the redacted area, through the use of a software library and/or command line interface (CLI), and by using application protocol interfaces (APIs) and available text extraction tools.

The present disclosure provides a method for analyzing a document to identify improperly redacted text by detecting text elements and redacted areas and identifying intersection between the text elements and the redacted areas.

According to one aspect of the disclosure, there is provided a method for detecting documents containing improperly redacted information. The method includes receiving a document and extracting text elements from the document. Each text element includes text and a text area identifying a location of the text. The method also identifies at least one redacted area. For each of the at least one redacted area, the method determines whether one of the extracted text elements has a text area that overlaps with the redacted area. When one of the extracted text elements has a text area that overlaps with the redacted area, the method identifies as overlapping text elements at least one of the extracted text elements having a text area that overlaps with the redacted area. For each of the identified overlapping text elements, the method computes an area of intersection between the redacted area and the text area of the overlapping text element. When the area of intersection is greater than an intersection threshold, the method outputs that the document contains improperly redacted information.

Alternatively or additionally, the method further includes rendering an image of the document.

Alternatively or additionally, the rendered image of the document does not include text.

Alternatively or additionally, the identifying of each of the at least one redacted area includes generating a binary image of the document by applying a redaction threshold to the rendered image and identifying contours in the binary image. For each of the identified contours, the method computes a bounding box of the identified contour and determines a height and a width for the bounding box. The method also compares the height of the bounding box to a minimum height threshold and compares the width of the bounding box to a minimum width threshold. When the height is larger than the minimum height threshold and the width is larger than the minimum width threshold, the method determines a number of pixels bound by the contour and compares the number of pixels to a minimum pixel threshold. When the number of pixels is greater than the minimum pixel threshold, the method determines a number of foreground pixels and a number of background pixels bound by the contour and determines a ratio of the foreground pixels and the background pixels. The method also compares the ratio to a ratio threshold. When the ratio is greater than the ratio threshold, the method includes the contour in the identified at least one redacted area.

Alternatively or additionally, each of the at least one redacted area is a rectilinear polygon.

Alternatively or additionally, when it is output that the document contains improperly redacted information, the method outputs the text of the text element having an area of intersection greater than the intersection threshold.

Alternatively or additionally, the comparison of the area of intersection to the intersection threshold includes calculating as an intersection ratio a ratio of the area of intersection to the redacted area and compares the calculated intersection ratio to the intersection threshold.

According to another aspect of the disclosure, there is provided an electronic device for detecting documents containing improperly redacted information. The electronic device includes circuitry configured to receiving a document and extracting text elements from the document. Each text element includes text and a text area identifying a location of the text. The circuitry identifies at least one redacted area.

For each of the at least one redacted area, the circuitry determines whether one of the extracted text elements has a text area that overlaps with the redacted area. When one of the extracted text elements has a text area that overlaps with the redacted area, the circuitry identifies as overlapping text elements at least one of the extracted text elements having a text area that overlaps with the redacted area. For each of the identified overlapping text elements, the circuitry computes an area of intersection between the redacted area and the text area of the overlapping text element. When the area of intersection is greater than an intersection threshold, the circuitry outputs that the document contains improperly redacted information.

Alternatively or additionally, the circuitry renders an image of the document.

Alternatively or additionally, the rendered image of the document does not include text.

Alternatively or additionally, the identifying of each of the at least one redacted area includes generating a binary image of the document by applying a redaction threshold to the rendered image and identifying contours in the binary image. For each of the identified contours, the circuitry computes a bounding box of the identified contour and determines a height and a width for the bounding box. The circuitry also compares the height of the bounding box to a minimum height threshold and compares the width of the bounding box to a minimum width threshold. When the height is larger than the minimum height threshold and the width is larger than the minimum width threshold, the circuitry and determines a number of pixels bound by the contour and compares the number of pixels to a minimum pixel threshold. When the number of pixels is greater than the minimum pixel threshold, the circuitry determines a number of foreground pixels and a number of background pixels bound by the contour and determines a ratio of the foreground pixels and the background pixels. The circuitry also compares the ratio to a ratio threshold and, when the ratio is greater than the ratio threshold, the circuitry includes the contour in the identified at least one redacted area.

Alternatively or additionally, each of the at least one redacted area is a rectilinear polygon.

Alternatively or additionally, when it is output that the document contains improperly redacted information, the circuitry outputs the text of the text element having an area of intersection greater than the intersection threshold.

According to still another aspect of the disclosure, there is provided a system for detecting documents containing improperly redacted information. The system includes the electronic device and a server. The server is in electronic communication with the electronic device and provides the document to the electronic device.

According to a further aspect of the disclosure, there is provided a non-transitory computer readable memory storing a program for detecting documents containing improperly redacted information, the program configured to be executed by circuitry and to cause the circuitry to receive a document and extract text elements from the document. Each text element includes text and a text area identifying a location of the text. The circuitry also identifies at least one redacted area. For each of the at least one redacted area, the circuitry determines whether one of the extracted text elements has a text area that overlaps with the redacted area. When one of the extracted text elements has a text area that overlaps with the redacted area, the circuitry identifies as overlapping text elements at least one of the extracted text elements having a text area that overlaps with the redacted area. For each of the identified overlapping text elements, the circuitry computes an area of intersection between the redacted area and the text area of the overlapping text element. When the area of intersection is greater than an intersection threshold, the circuitry outputs that the document contains improperly redacted information.

Alternatively or additionally, the circuitry renders an image of the document.

Alternatively or additionally, the rendered image of the document does not include text.

Alternatively or additionally, the identifying of each of the at least one redacted area includes generating a binary image of the document by applying a redaction threshold to the rendered image and identifying contours in the binary image. For each of the identified contours, computes a bounding box of the identified contour and determines a height and a width for the bounding box. The circuitry compares the height of the bounding box to a minimum height threshold and compares the width of the bounding box to a minimum width threshold. When the height is larger than the minimum height threshold and the width is larger than the minimum width threshold, the circuitry determines a number of pixels bound by the contour and compares the number of pixels to a minimum pixel threshold. When the number of pixels is greater than the minimum pixel threshold, the circuitry determines a number of foreground pixels and a number of background pixels bound by the contour and determines a ratio of the foreground pixels and the background pixels. The circuitry compares the ratio to a ratio threshold and, when the ratio is greater than the ratio threshold, includes the contour in the identified at least one redacted area.

Alternatively or additionally, each of the at least one redacted area is a rectilinear polygon.

Alternatively or additionally, when it is output that the document contains improperly redacted information, the circuitry outputs the text of the text element having an area of intersection greater than the intersection threshold.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

In the embodiment shown in FIG. 1, a block diagram of a system for detecting documents containing improperly redacted information is shown.

Figure 2:
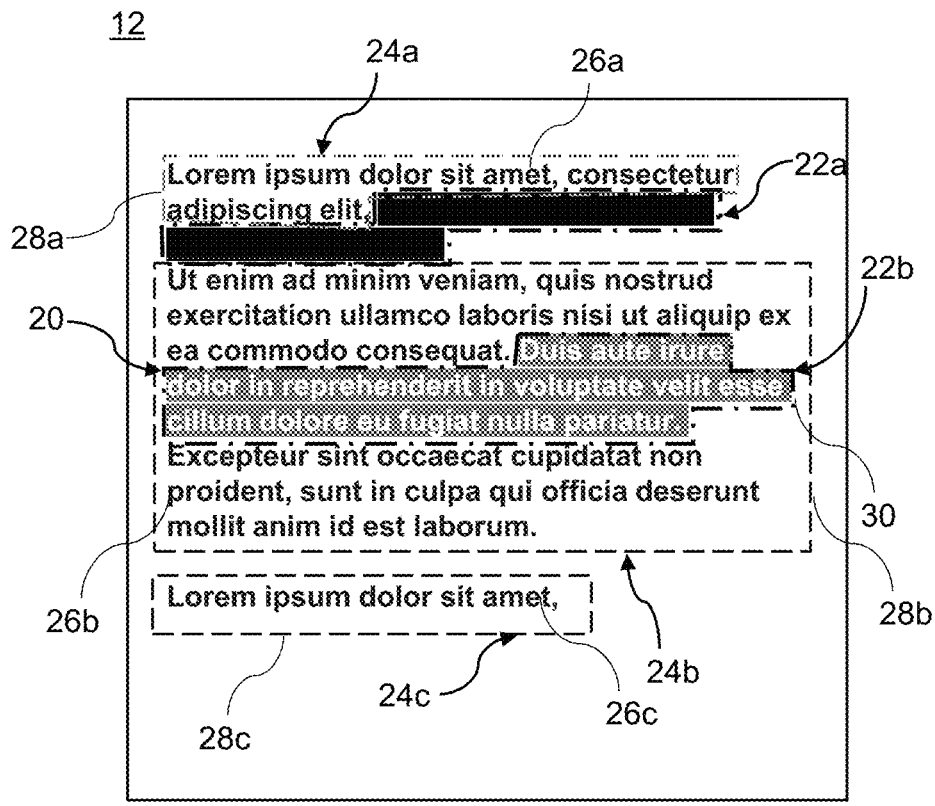

In the embodiment shown in FIG. 2, an exemplary document including improperly redacted information is depicted.

Figure 3:
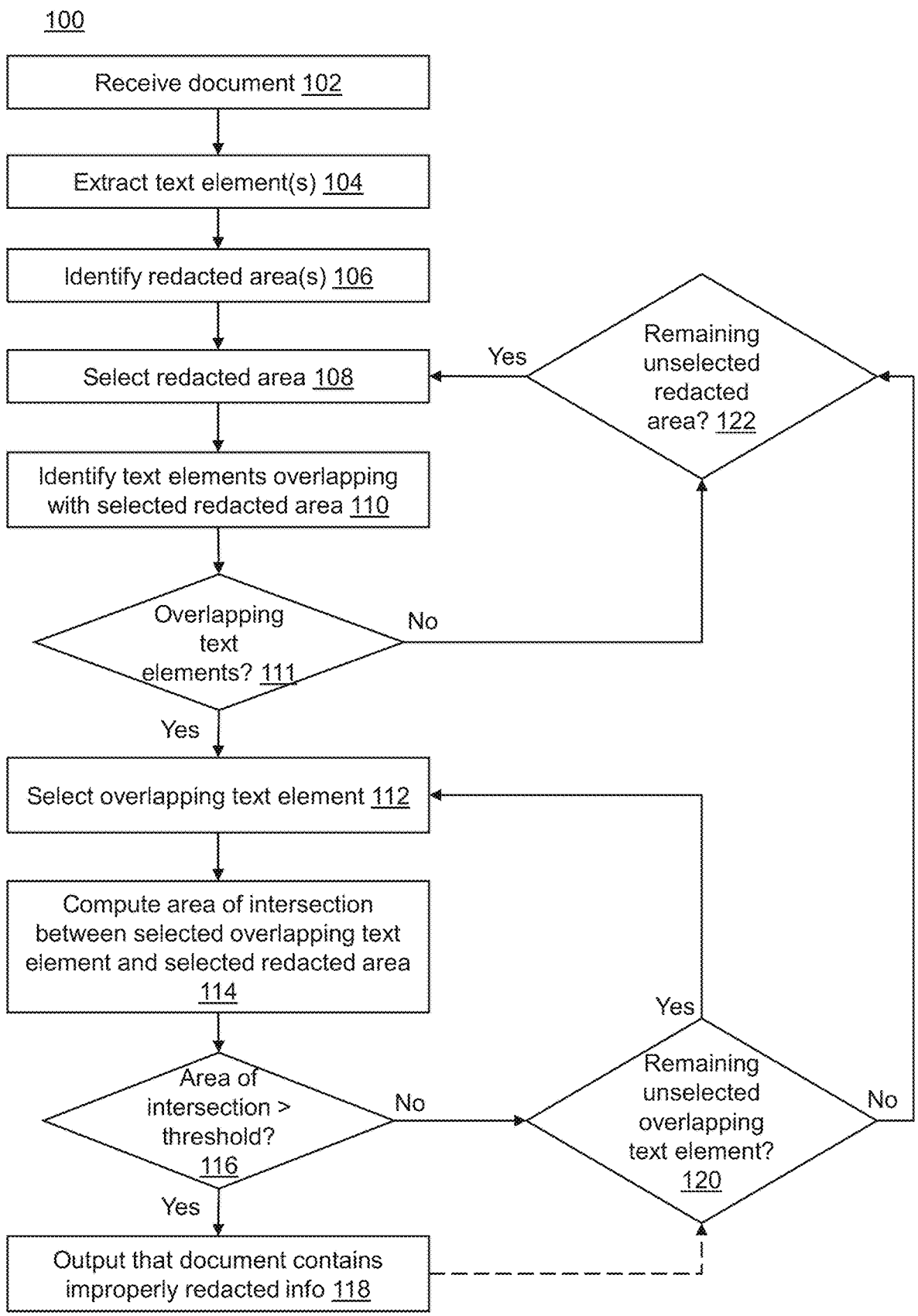

In the embodiment shown in FIG. 3, a flowchart of a method for detecting documents containing improperly redacted information is shown.

Figure 4:
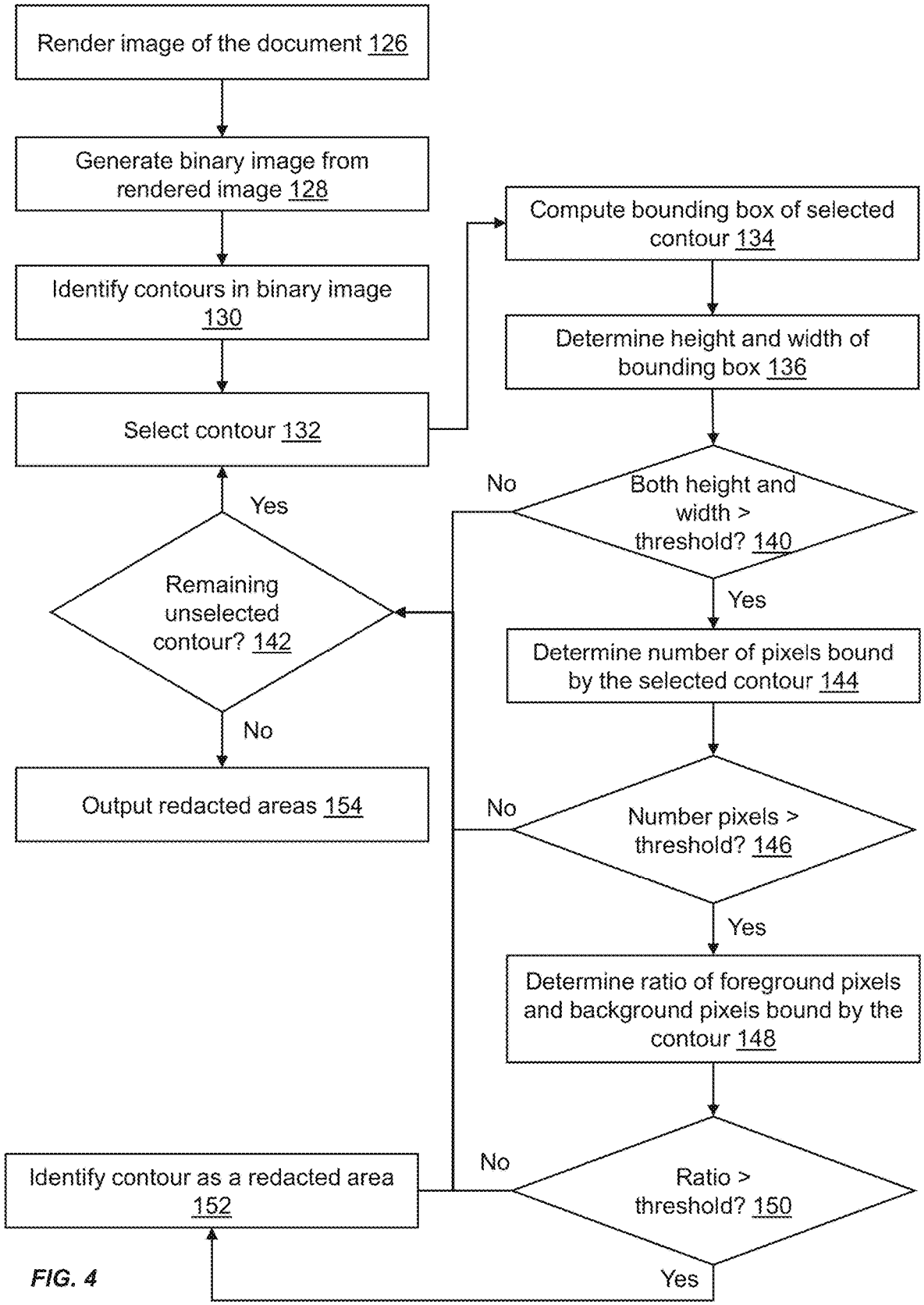

In the embodiment shown in FIG. 4, a flowchart of a method for identifying redacted areas is shown.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a system and method for providing data leak prevention (DLP) by detecting improperly redacted documents is provided. DLP may be applied to data as it is being used, while the data is in motion, or when the data is at rest. An example of applying DLP to data in motion is on an email server handling an outgoing email. In this example, DLP can be used to scan an outgoing email to detect the presence of improperly redacted information. If improperly redacted information is detected, a notification may be issued and the email may be quarantined until further instructions are received concerning the email (e.g., sending, redacting, deleting, etc.). Similarly, DLP technology could be applied on the email client that is about to send such an email, to detect and prevent the sending of such an email.

DLP can be used to scan data at rest such as a repository of publicly released documents. If improperly redacted information (also referred to as confidential information) is found in the repository, the document containing the improperly redacted information may be removed from the repository and users that accessed the document may be contacted to request that any copies of the document be deleted.

Figure 1:
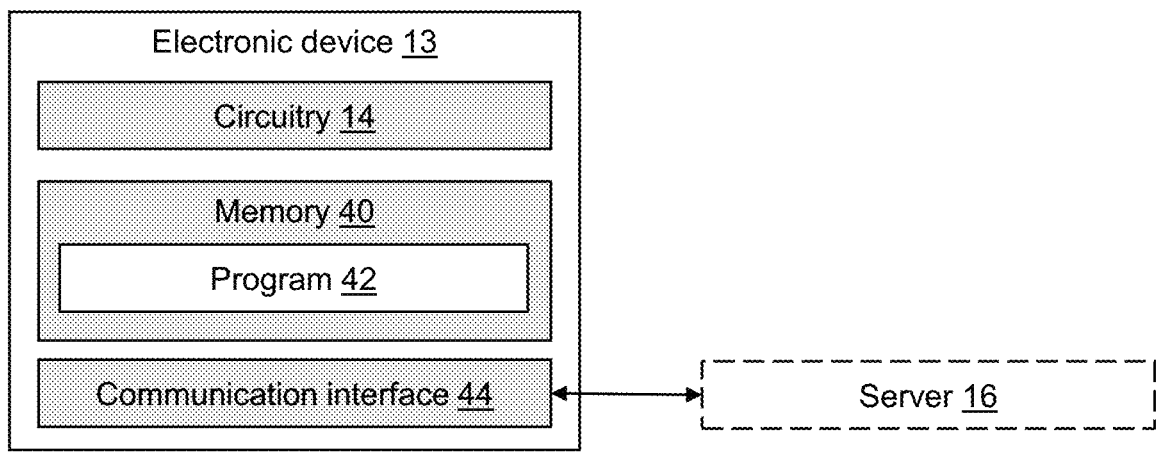

Turning to FIG. 1 a system 10 for detecting document(s) 12 containing improperly redacted information is shown. The system 10 includes an electronic device 13 and a server 16 in electronic communication with the electronic device 13. The server 16 provides the document 12 to the electronic device 13. The circuitry 14 analyzes the document 12 to detect redacted area(s) 22 and text element(s) 24. The circuitry 14 also identifies any intersection 20 (i.e., an overlap) between the detected redacted area(s) 22 and the detected text element(s) 24. When an intersection 20 is detected having an area greater than an intersection threshold, the document 12 is identified as containing improperly redacted information.

The documents 12 being analyzed may be any suitable format for communicating electronic information. For example, the documents 12 may have the format of Portable Document Format (PDF), DOCX, XLSX, PPTX, EPUB, ODX, Rich Text Format (RTF), HTML, MSG, etc. The tool used to extract text from the document 12 may be chosen based on the file type of the document 12. The file type of the document 12 may be determined by examining the file suffix and/or examining the file content.

The circuitry 14 receives the document 12 and extracts text elements 24 from the document 12. Each text element 24 includes text 26 and a text area 28 identifying a location of the text 26. The text element(s) 24 may be extracted from the document 12 using any suitable technique. For example, there exist various tools allowing extraction, editing, and/or manipulation of electronic documents. These tools can be in the form a command line interface (CLI) or as software libraries. For example, the poppler software library and CLI tools supports: extraction of the text found in one or more pages of a PDF document along with the position within the page of said text; and rendering one or more page of a PDF document into an image file format such as PNG or JPEG with or without the text elements found in said pages.

In addition to extracting the text elements 24, the circuitry 14 also identifies at least one redacted area 22. For each of the identified redacted area(s) 22, the circuitry 14 determines whether one of the extracted text elements 24 has a text area 28 that overlaps with the redacted area 22. The extracted text elements 24 having a text area 28 that overlaps with the redacted area 22 are identified by the circuitry 14 as overlapping text element(s) 30.

In FIG. 2, an exemplary document 12 including three text elements 24a, 24b, 24c (outlined with dashed lines) and two redacted areas 22a, 22b (outlined with dash-dot lines) is shown. In the first redacted area 22a, the text has been redacted, such that the text is no longer legible or extractable. However, in the second redacted area 22b, the text has not been completely redacted, such that the text is still legible. Even though the text in the first redacted area 22a has been redacted, the text area 28a partially overlaps with the first redacted area 22a. In the second text element 24b, the second redacted area 22b completely overlaps with the text area 28b of the second text element 24b, because the text overlapping with the second redacted area 22b is legible and this text is part of the text of the second text element 24b.

In FIG. 2, the text overlapping with the second redacted area 22b is shown in a different color from the other text of the second text element 24b for illustrative purposes to emphasize that this text has not been sufficiently redacted.

For each of the identified overlapping text elements, the circuitry 14 computes an area of intersection between the redacted area 22 and the text area 28 of the overlapping text element. The circuitry 14 then determines whether the area of intersection is greater than an intersection threshold. When the area of intersection is greater than an intersection threshold, the circuitry 14 outputs that the document 12 contains improperly redacted information. For example, a notification may be sent identifying the filename of documents 12 including improperly redacted information. In one embodiment, the circuitry outputs the text of the text element 24 having an area of intersection greater than the intersection threshold. That is, the circuitry may output the text that was improperly redacted.

In one embodiment, the comparison of the area of intersection to the intersection threshold includes calculating an intersection ratio. The intersection ratio is a ratio of the area of intersection to the redacted area. The intersection ratio is then compared to the intersection threshold.

Returning to the exemplary document 12 shown in FIG. 2, the area of intersection between the first text element 24a and the first redacted area 22a is small because the first text element 24a and the first redacted area 22a only partially overlap. The intersection ratio between the first text element 24a and the first redacted area 22a is a small percentage (e.g., less than 5%) and is less than the intersection threshold. Consequently, the first redacted area 22a is determined to not include improperly redacted information.

Conversely, in FIG. 2, the second redacted area 22b completely overlaps with the second text element 24b, such that the intersection ratio is 100% for the second redacted area 22b. If the intersection threshold is 25%, then the area of intersection of the second redacted area 22b is greater than the intersection threshold and the second redacted area 22b is identified as containing improperly redacted information.

In the embodiment shown in FIG. 3, a method 100 for detecting documents containing improperly redacted information is shown. In process block 102, a document 12 is received. In process block 104, text elements 24 are extracted from the document 12. In process block 106, redacted areas 22 are identified in the document 12.

In process block 108, one of the redacted areas 22 is selected. In process block 110, text element(s) that overlap with the selected redacted area (overlapping text elements) are identified. In decision block 111, if overlapping text elements are found, then processing moves to process block 112. In process block 112, an overlapping text element is selected. In process block 114, an area of intersection is computed between the redacted area 22 and the text area 28 of the overlapping text element 24. In decision block 116, a check is performed to determine if the area of intersection is greater than the intersection threshold. If yes, processing moves to process block 118 and it is output that the document 12 contains improperly redacted information. Following process block 118, processing may optionally move to process block 120 to identify further redacted information (e.g., if the improperly redacted text is being output).

If the area of intersection is less than the threshold in decision block 116, then processing continues to decision block 120. In decision block 120, a check is performed to determine if there are any remaining unselected overlapping text element(s). If yes, then processing returns to process block 112. If no, then processing moves to decision block 122. In decision block 122, a check is performed to determine if there are any remaining unselected redacted areas. If yes, then processing returns to process block 108. If no, the method 100 may stop execution or optionally output (if no improperly redacted information was found) that the document does not contain improperly redacted information.

In the embodiment shown in FIG. 4, a process for identifying redacted areas 22 is shown. In process block 126, an image of the document is rendered. For example, the document may be rendered with text, without text, or separately both with and without text. In process block 128, a binary image of the document 12 is generated by applying a redaction threshold to the rendered image. The redaction threshold may be chosen such that redaction areas are selected by the threshold. For example, redacted areas are typically dark in color. For this reason, the redaction threshold may be used to highlight any pixels having an intensity less than the redaction threshold (e.g., 50).

In process block 130, contours are identified in the binary image. For example, the contours may be an outline surrounding foreground pixels in the binary image (e.g., pixels having a value of 1). In FIG. 2, the dash-dot lines are exemplary contours surrounding the redacted areas 22.

For each of the identified contours, a bounding box is computed. For example, in process block 132, one of the identified contours is selected. In process block 134, a bounding box is computed for the selected contour. In one embodiment, the bounding box is a rectangle surrounding the selected contour. In one embodiment, the redacted area is a rectilinear polygon.

In process block 136, a height and width of the bounding box is determined. In decision block 140, the height of the bounding box is compared to a minimum height threshold and the width of the bounding box is compared to a minimum width threshold. For example, the minimum height threshold and the minimum width threshold may be chosen to selectively remove text selected in the binary image.

When the height is larger than the minimum height threshold and the width is larger than the minimum width threshold, processing moves to process block 144. in process block 144, a number of pixels bound by the contour is determined. In decision block 146, the number of pixels is compared to a minimum pixel threshold. For example, the minimum pixel threshold may also be chosen to selectively remove text selected in the binary image.

When the number of pixels is greater than the minimum pixel threshold, processing moves to process block 148. In process block 148, a number of foreground pixels and a number of background pixels bound by the contour is determined and a ratio of the foreground pixels and the background pixels is determined.

In decision block 150, the ratio is compared to a ratio threshold. When the ratio is greater than the ratio threshold, processing moves to process block 152. In process block 152 the contour is identified as a redacted area. Following process block 152, processing moves to decision block 142. In decision block 142, remaining unselected contour(s) are identified. If there are no remaining unselected contours, then the redacted areas are output in process block 154. If there are remaining unselected contours, then processing returns to process block 132.

If the height or width of the bounding box is less than the corresponding threshold in decision block 140, if the number of pixels is less than the pixel threshold in decision block 146, or if the ratio is less than the ration threshold in decision block 150, then processing moves to decision block 142.

Identifying the redacted areas 22 may be performed in part using various image processing libraries (e.g., OpenCV library, https://opencv.org/). Similarly, for PDF documents, the poppler library and tools may be used.

Rendering the image of the document and/or processing the document to identify the retracted areas 22 may be performed page by page. That is, the document 12 may include multiple pages and the pages of the document may be rendered separately.

The method 100 may be embodied as a non-transitory computer readable memory 40 storing a program 42 for detecting documents 12 containing improperly redacted information. The program 42 is configured to be executed by circuitry 14 and to cause the circuitry 14 to perform the method 100.

The circuitry 14 may have various implementations. For example, the circuitry 14 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 14 may also include a non-transitory computer readable medium, such as random access memory (RAM), a read-only memory (ROM), an erasable programmable read-only memory (EPROM or Flash memory), or any other suitable medium. Instructions for performing the method described below may be stored in the non-transitory computer readable medium and executed by the circuitry 14. The circuitry 14 may be communicatively coupled to the computer readable medium and network interface through a system bus, mother board, or using any other suitable structure known in the art.

In one embodiment, the electronic device 12 includes a communication interface 44 that is in communication with the server 16. The communication interface receives the document(s) 12 from the server and the circuitry 14 notifies the server 16 if any improperly redacted information is found in any of the documents 12.

As described above, in one embodiment the circuitry 14 may monitor a location (e.g., a folder, outgoing email on an email server, a website, etc.) and analyze any documents 12 found in this location to identify improperly redacted information. If improperly redacted information is found, the circuitry 14 may alert a user and/or administrator, quarantine the document, and/or log the event. In one embodiment, the circuitry 14 may identify improperly redacted documents 12 made available to the public by a competitor.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method for detecting documents containing improperly redacted information, the method comprising:
   receiving a document;
   extracting text elements from the document, wherein each text element includes text and a text area identifying a location of the text;
   identify at least one redacted area; and
   for each of the at least one redacted area:
      determine whether one of the extracted text elements has a text area that overlaps with the redacted area;
      when one of the extracted text elements has a text area that overlaps with the redacted area, identify as overlapping text elements at least one of the extracted text elements having a text area that overlaps with the redacted area; and
      for each of the identified overlapping text elements:
         compute an area of intersection between the redacted area and the text area of the overlapping text element; and
         when the area of intersection is greater than an intersection threshold, outputting that the document contains improperly redacted information.

2. The method of claim 1, further comprising rendering an image of the document.

3. The method of claim 2, wherein the rendered image of the document does not include text.

4. The method of claim 2, wherein the identifying of each of the at least one redacted area includes:
   generating a binary image of the document by applying a redaction threshold to the rendered image;
   identifying contours in the binary image; and
   for each of the identified contours:
      computing a bounding box of the identified contour;
      determining a height and a width for the bounding box;
      comparing the height of the bounding box to a minimum height threshold;
      comparing the width of the bounding box to a minimum width threshold; and
      when the height is larger than the minimum height threshold and the width is larger than the minimum width threshold:
         determining a number of pixels bound by the contour;
         comparing the number of pixels to a minimum pixel threshold; and
         when the number of pixels is greater than the minimum pixel threshold:
            determining a number of foreground pixels and a number of background pixels bound by the contour;
            determining a ratio of the foreground pixels and the background pixels;
            comparing the ratio to a ratio threshold; and
            when the ratio is greater than the ratio threshold, include the contour in the identified at least one redacted area.

5. The method of claim 1, wherein each of the at least one redacted area is a rectilinear polygon.

6. The method of claim 1, further comprising, when it is output that the document contains improperly redacted information, outputting the text of the text element having an area of intersection greater than the intersection threshold.

7. The method of claim 1, wherein the comparison of the area of intersection to the intersection threshold includes:
   calculating as an intersection ratio a ratio of the area of intersection to the redacted area; and
   comparing the calculated intersection ratio to the intersection threshold.

8. An electronic device for detecting documents containing improperly redacted information, the electronic device comprising circuitry configured to:
   receive a document;
   extract text elements from the document, wherein each text element includes text and a text area identifying a location of the text;
   identify at least one redacted area;
   for each of the at least one redacted area:
      determine whether one of the extracted text elements has a text area that overlaps with the redacted area;
      when one of the extracted text elements has a text area that overlaps with the redacted area, identify as overlapping text elements at least one of the extracted text elements having a text area that overlaps with the redacted area;
      for each of the identified overlapping text elements:
         compute an area of intersection between the redacted area and the text area of the overlapping text element; and
         when the area of intersection is greater than an intersection threshold, output that the document contains improperly redacted information.

9. The electronic device of claim 8, further comprising rendering an image of the document.

10. The electronic device of claim 9, wherein the rendered image of the document does not include text.

11. The electronic device of claim 9, wherein the identifying of each of the at least one redacted area includes:

generating a binary image of the document by applying a redaction threshold to the rendered image;

identifying contours in the binary image; and for each of the identified contours:
- computing a bounding box of the identified contour;
- determining a height and a width for the bounding box;
- comparing the height of the bounding box to a minimum height threshold;
- comparing the width of the bounding box to a minimum width threshold; and
- when the height is larger than the minimum height threshold and the width is larger than the minimum width threshold:
  - determining a number of pixels bound by the contour;
  - comparing the number of pixels to a minimum pixel threshold; and
  - when the number of pixels is greater than the minimum pixel threshold:
    - determining a number of foreground pixels and a number of background pixels bound by the contour;
    - determining a ratio of the foreground pixels and the background pixels;
    - comparing the ratio to a ratio threshold; and
    - when the ratio is greater than the ratio threshold, include the contour in the identified at least one redacted area.

12. The electronic device of claim 8, wherein each of the at least one redacted area is a rectilinear polygon.

13. The electronic device of claim 8, further comprising, when it is output that the document contains improperly redacted information, outputting the text of the text element having an area of intersection greater than the intersection threshold.

14. A system for detecting documents containing improperly redacted information, the system comprising:
- the electronic device of claim 8; and
- a server in electronic communication with the electronic device and configured to provide the document to the electronic device.

15. A non-transitory computer readable memory storing a program for detecting documents containing improperly redacted information, the program configured to be executed by circuitry and to cause the circuitry to:
- receive a document;
- extract text elements from the document, wherein each text element includes text and a text area identifying a location of the text;
- identify at least one redacted area; and
- for each of the at least one redacted area:
  - determine whether one of the extracted text elements has a text area that overlaps with the redacted area;
  - when one of the extracted text elements has a text area that overlaps with the redacted area, identify as overlapping text elements at least one of the extracted text elements having a text area that overlaps with the redacted area; and
  - for each of the identified overlapping text elements:
    - compute an area of intersection between the redacted area and the text area of the overlapping text element; and
    - when the area of intersection is greater than an intersection threshold, outputting that the document contains improperly redacted information.

16. The memory of claim 15, further comprising rendering an image of the document.

17. The memory of claim 16, wherein the rendered image of the document does not include text.

18. The memory of claim wherein the identifying of each of the at least one redacted area includes:
- generating a binary image of the document by applying a redaction threshold to the rendered image;
- identifying contours in the binary image; and
- for each of the identified contours:
  - computing a bounding box of the identified contour;
  - determining a height and a width for the bounding box;
  - comparing the height of the bounding box to a minimum height threshold;
  - comparing the width of the bounding box to a minimum width threshold; and
  - when the height is larger than the minimum height threshold and the width is larger than the minimum width threshold:
    - determining a number of pixels bound by the contour;
    - comparing the number of pixels to a minimum pixel threshold; and
    - when the number of pixels is greater than the minimum pixel threshold:
      - determining a number of foreground pixels and a number of background pixels bound by the contour;
      - determining a ratio of the foreground pixels and the background pixels;
      - comparing the ratio to a ratio threshold; and
      - when the ratio is greater than the ratio threshold, include the contour in the identified at least one redacted area.

19. The memory of claim 15, wherein each of the at least one redacted area is a rectilinear polygon.

20. The memory of claim 15, further comprising, when it is output that the document contains improperly redacted information, outputting the text of the text element having an area of intersection greater than the intersection threshold.

* * * * *